United States Patent Office 2,715,119
Patented Aug. 9, 1955

2,715,119

PREPARATION OF AMIDES

Theodor Wieland, Mainz, and Richard Sehring, Ingelheim am Rhein, Germany, assignors to "C. H. Boehringer Sohn," Ingelheim am Rhein, Germany, a partnership No Drawing. Application March 15, 1951,
Serial No. 215,866

Claims priority, application Germany April 4, 1950

5 Claims. (Cl. 260—112)

The invention is concerned with improvements in or relating to the preparation of amides or substituted amides from aminoacids or peptides, which compounds are important not only as intermediate products but also as efficient pharmaceutical compounds.

The usual process for the synthesis of aminoacid amides or peptide amides consists in the reaction of halides of the acids with ammonia or amines. These halides are often impure; for example, the carbobenzoxylated aminoacid chlorides break down into internal anhydrides with splitting off of benzylchloride.

Another method for the production of the amides is by way of the esters which are reacted with ammonia or amines. This process has in particular the disadvantage in the case of unstable peptides that a deamidation or even a decomposition can result.

According to the present invention there is provided a process for the preparation of amides and substituted amides in which anhydrides of the general formula

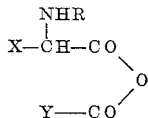

derived from aminoacids or peptides and any desired carboxylic acid, are reacted with ammonia, or amonio compounds of the general formula

by addition of the calculated quantities of the base, to yield acid derivatives of the general formula:

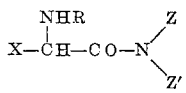

In the above formulae R is an alkyl, aralkyl, acyl or another radical suitable for the protection of an amino group and capable of being subsequently readily split off again, X is any organic radical residue present in aminoacids or peptides, Y is an alkyl, aryl, aralkyl, alkoxy or similar group and Z and Z' are a hydrogen atom or an organic radical present in the reacting amino group.

In our copending application Serial No. 215,865, filed March 15, 1951, a process for the production of peptides is described in which anhydrides of the above mentioned type are reacted with aminoacid peptides of lower molecular weight or their esters by addition of the calculated quantities of a base, to yield peptides. This process is not the subject of the present invention.

In the reaction of the anhydrides with ammonia or with an amino compound according to the process of the present invention, the desired amides result in the presence of bases, together with the salt of the other carboxylic acid forming the basis of the anhydride in question, according to the following reaction equation:

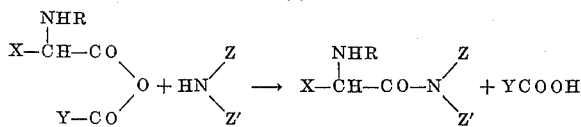

The production of the anhydrides employed according to the invention is given in our said copending application.

In carrying out the process according to the invention it is not necessary to isolate the anhydride in every case. The anhydride produced in anhydrous medium can also be reacted directly with ammonia or the solution of an amino compound.

The process according to the invention shows numerous advantages over the known methods of preparation for amides, in particular the production of labile aminoacid chlorides is avoided. For the carrying out of the reaction no heating is necessary. The conditions are so mild that unstable components can also be used.

In order that the invention may be well understood the following examples are given only as illustrations.

EXAMPLE 1

*Production of phthalylglycine anilide*

1 g. N phthalylglycine benzoate were mixed with 2 g. aniline and during the course of five minutes mixed with sufficient 2N hydrochloric acid to bring the oily aniline into solution. There remained behind a crystalline substance which was removed by filtering under suction. After washing with dilute ammonia it was recrystallised from aqueous alcohol.

Yield: 1.3 g.; M. P.=231° C.

$C_{16}H_{12}N_2O_3$ (280.27). Calculated: C 68.56, H 4.32, N 10.0. Found: C 68.35, H 4.52, N 9.72.

EXAMPLE 2

*Production of carbobenzoxycystine anilide*

2.5 g. carbobenzoxycystine and 1.2 g. ethylpiperidine were dissolved in 50 cc. benzene and mixed with 1.4 g. benzoylchloride. Ethylpiperdine hydrochloride separated out and was filtered off. 1.5 g. aniline were added to this benzene solution of the anhydride and allowed to stand for ten minutes. The benzene was then evaporated in vacuo and the oily residue mixed with 2N hydrochloric acid. A white substance separated out which after recrystallisation from methanol had a melting point of 212° C., sintering at about 200° C.

Yield: 2.5 g.

$C_{34}H_{32}O_6N_4S_2 + 1H_2O$ (676.77). Calculated: C 60.33, H 5.03, N 8.28. Found: C 60.29, H 5.35, N 8.36.

EXAMPLE 3

*Production of carbobenzoxycystine amide*

The anhydride was prepared as given in Example 2. It was now mixed with ethereal ammonia solution during which the amide separated out. It was boiled with a little methanol, washed with water, dried in vacuo and recrystallised from methanol.

Yield about 60%; M. P.=182° C. (dec.).

$C_{22}H_{24}O_6N_4S_2$ (504.54). Calculated: N 11.11. Found: N 10.8.

EXAMPLE 4

*Production of carbobenboxyglycyl-p-aminobenzoic acid*

1 g. carbobenzoxyglycine was suspended in 5 ml. benzonitrile and brought into solution with 0.6 g. ethylpiperidine. On addition of 0.7 g. benzoylchloride the solution of the anhydride was obtained and this brought into reaction with the alkaline solution of 0.7 g. p-amino-benzoic acid. After extraction of the benzonitrile with ether the alkaline solution was acidified with 2N hydrochloric acid.

A yellow oil separated out which was still contaminated with benzonitrile. It was now separated from the aqueous layer and dried in vacuo. The dried substance was dissolved in tetrahydrofuran and precipitated with petroleum-ether.

Yield: 0.8 g.; M. P.=224° C.

After hydrolysis with concentrated hydrochloric acid a positive ninhydrin test was obtained.

$C_{17}H_{16}N_2O_5$ (332.3). Calculated: N 8.47. Found N 8.85.

EXAMPLE 5

Production of phthalylglycylglycine anilide 1.85 g. of the silver salt of phthalylglycylglycine were suspended in nitrobenzene and shaken with 0.7 g. benzolychloride at 80° C. After centrifuging off the silver chloride the filtrate was mixed with 1 cc. aniline. The anilide was precipitated with petroleum-ether and the precipitated oil was acidified with hydrochloric acid. Finally it was recrystallised from alcohol. M. P.=262° C.

$C_{18}H_{15}N_3O_4$ (337.33). Calculated: C 64.07, H 4.48, N 12.4. Found: C 63.83, H 4.42, N 12.1.

EXAMPLE 6

Production of carbobenzoxygycylglycin anilide 1.3 g. carbobenzoxyglycylglycine were converted into the anhydride by way of the ethylpiperidine salt in benzonitrile solution with benzoylchloride. It was mixed with aniline and acidified. The anilide was precipitated from the benzonitrile solution with petroleum-ether and recrystallised from alcohol.

Yield: 1.5 g.; M. P.=198° C.

$C_{18}H_{19}N_3O_4$ (341.35). Calculated: C 63.50, H 5.56, N 12.4. Found: C 63.28, H 5.66, N 12.7.

EXAMPLE 7

Production of carbobenzoxy-diglycine-diethyl amide using an alkoxycarbonyl chloride 1.33 g. carbobenzoxy-diglycine were brought into solution with 0.7 cc. N-ethylpiperidine in a few cc. benzene, cooled to 5° C. and mixed dropwise with 0.5 cc. chlorcarbonic acid ethyl ester with vigorous stirring. 1.6 g. of anhydrous diethylamine were now added without further cooling and allowed to stand at room temperature for an hour. Then the solvent was evaporated in vacuo, the residue washed with dilute soda solution, dilute hydrochloric acid and water and recrystallised from benzene after drying.

Yield: 1 g. of crystals; M. P.=114°–115° C.

Calculated: N 13.08. Found: N 13.17.

What we claim is:

1. The method of producing organic amides which comprises reacting a compound selected from the group consisting of ammonia and amines of the formula $ZNH_2$ and $(Z)_2NH$ wherein Z is a hydrocarbon radical, with a mixed external anhydride formed by a monocarboxylic acid selected from the group consisting of lower alkanoic acids, benzoic acid, and phenyl lower alkanoic acids having at least two carbon atoms in their molecule and a compound selected from the group consisting of monoamino-monocarboxylic acids and peptides having at least one peptide group in their molecule, and separating the reaction product in the form of the desired amide from the reaction mass.

2. The method of producing organic amides which comprises reacting a compound selected from the group consisting of ammonia and amines of the formula $ZNH_2$ and $(Z)_2NH$ wherein Z is a hydrocarbon radical, with a mixed external anhydride formed by a monocarboxylic acid selected from the group consisting of lower alkanoic acids, benzoic acid, and phenyl lower alkanoic acids having at least two carbon atoms in their molecule, and a compound selected from the group consisting of monoamino-monocarboxylic acids and peptides having at least one peptide group in their molecule, in the presence of an inert organic solvent, and separating the reaction product in the form of the desired amide from the reaction mass.

3. The method of producing organic amides as in claim 1, wherein the materials are reacted with each other in equimolecular proportions.

4. The method of producing organic amides which comprises reacting a compound selected from the group consisting of ammonia and amines of the formula $ZNH_2$ and $(Z)_2NH$ wherein Z is a hydrocarbon radical, with a mixed external anhydride formed by a lower alkanic monocarboxylic acid having at least two carbon atoms in its molecule and a compound selected from the group consisting of monoamino-monocarboxylic acids and peptides having at least one peptide group in their molecule, in substantially equimolecular proportions and in the presence of an inert organic solvent, and separating the reaction product in the form of the desired amide from the reaction mass.

5. The method of producing organic amides which comprises reacting a compound selected from the group consisting of ammonia and amines of the formula $ZNH_2$ and $(Z)_2NH$ wherein Z is a hydrocarbon radical, with a mixed external anhydride formed by benzoic acid and a compound selected from the group consisting of monoamino-monocarboxylic acids and peptides having at least one peptide group in their molecule, in substantially equimolecular proportions and in the presence of an inert organic solvent, and separating the reaction product in the form of the desired amide from the reaction mass.

References Cited in the file of this patent

UNITED STATES PATENTS

| Number | Name | Date |
|---|---|---|
| 648,580 | Behal | May 1, 1900 |
| 902,150 | Heidenreich | Oct. 27, 1908 |
| 1,963,138 | Martin et al. | June 19, 1934 |
| 2,186,769 | Schirm | Jan. 9, 1940 |

FOREIGN PATENTS

| Number | Country | Date |
|---|---|---|
| 59,121 | Germany | Dec. 13, 1890 |
| 600,893 | Great Britain | Apr. 21, 1948 |

OTHER REFERENCES

Degering: An Outline of Org. N. Cpds. (1945), pp. 303.

Bailey: "Nature," vol. 164, November 19, 1949, p. 889.

Anson: Advances in Protein Chem., vol. 5, pp. 41–46 (1949).

Wieland et al.: Liebigs Ann., vol. 569, pp. 117–129 (1950).